United States Patent
Gokhale et al.

(10) Patent No.: US 9,262,226 B2
(45) Date of Patent: *Feb. 16, 2016

(54) DATA STORAGE RESOURCE ALLOCATION BY EMPLOYING DYNAMIC METHODS AND BLACKLISTING RESOURCE REQUEST POOLS

(71) Applicant: CommVault Systems, Inc., Oceanport, NJ (US)

(72) Inventors: Parag Gokhale, Marlboro, NJ (US); Rajiv Kottomtharayil, Marlboro, NJ (US); Amey Vijaykumar Karandikar, Long Branch, NJ (US); Yu Wang, Edison, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 395 days.

This patent is subject to a terminal disclaimer.

(21) Appl. No.: 13/736,318

(22) Filed: Jan. 8, 2013

(65) Prior Publication Data
US 2013/0145376 A1    Jun. 6, 2013

Related U.S. Application Data

(63) Continuation of application No. 12/142,445, filed on Jun. 19, 2008, now Pat. No. 8,352,954.

(51) Int. Cl.
*G06F 9/46* (2006.01)
*G06F 9/50* (2006.01)

(52) U.S. Cl.
CPC ........ *G06F 9/5016* (2013.01); *G06F 2209/502* (2013.01)

(58) Field of Classification Search
None
See application file for complete search history.

(56) References Cited

U.S. PATENT DOCUMENTS

| 4,464,122 A | 8/1984 | Fuller et al. |
| 4,686,620 A | 8/1987 | Ng |

(Continued)

FOREIGN PATENT DOCUMENTS

| EP | 0259912 A1 | 3/1988 |
| EP | 0405926 A2 | 1/1991 |

(Continued)

OTHER PUBLICATIONS

"Multi Instancing," retrieved from http://documentation.commvault.com/hds/release_8_0_0/books_online_1/english_us/deployment/install/misc/multi_instancing.htm[Feb. 18, 2014 11:57:19 AM] on Feb. 18, 2014, 3 pages.

(Continued)

*Primary Examiner* — Wissam Rashid
(74) *Attorney, Agent, or Firm* — Perkins Coie LLP

(57) ABSTRACT

A resource allocation system begins with an ordered plan for matching requests to resources that is sorted by priority. The resource allocation system optimizes the plan by determining those requests in the plan that will fail if performed. The resource allocation system removes or defers the determined requests. In addition, when a request that is performed fails, the resource allocation system may remove requests that require similar resources from the plan. Moreover, when resources are released by a request, the resource allocation system may place the resources in a temporary holding area until the resource allocation returns to the top of the ordered plan so that lower priority requests that are lower in the plan do not take resources that are needed by waiting higher priority requests higher in the plan.

21 Claims, 7 Drawing Sheets

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A * | 2/1994 | Stoppani, Jr. .................. 711/211 |
| 5,321,816 A | 6/1994 | Rogan et al. |
| 5,333,315 A | 7/1994 | Saether et al. |
| 5,347,653 A | 9/1994 | Flynn et al. |
| 5,386,545 A | 1/1995 | Gombos, Jr. et al. |
| 5,410,700 A | 4/1995 | Fecteau et al. |
| 5,448,718 A | 9/1995 | Cohn et al. |
| 5,448,724 A | 9/1995 | Hayashi |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,371 A | 9/1996 | Duyanovich et al. |
| 5,559,957 A | 9/1996 | Balk |
| 5,564,037 A | 10/1996 | Lam |
| 5,608,865 A | 3/1997 | Midgely et al. |
| 5,613,134 A | 3/1997 | Lucus et al. |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey, III |
| 5,666,501 A | 9/1997 | Jones et al. |
| 5,673,381 A | 9/1997 | Huai et al. |
| 5,673,382 A | 9/1997 | Cannon et al. |
| 5,699,361 A | 12/1997 | Ding et al. |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees et al. |
| 5,875,478 A | 2/1999 | Blumenau |
| 5,887,134 A | 3/1999 | Ebrahim |
| 5,896,531 A | 4/1999 | Curtis et al. |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,012,053 A | 1/2000 | Pant et al. |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough et al. |
| 6,073,128 A | 6/2000 | Pongracz et al. |
| 6,076,148 A | 6/2000 | Kedem |
| 6,091,518 A | 7/2000 | Anabuki et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis et al. |
| 6,212,512 B1 | 4/2001 | Barney et al. |
| 6,226,759 B1 | 5/2001 | Miller et al. |
| 6,239,800 B1 | 5/2001 | Mayhew et al. |
| 6,253,217 B1 | 6/2001 | Dourish et al. |
| 6,260,069 B1 | 7/2001 | Anglin |
| 6,266,679 B1 | 7/2001 | Szalwinski et al. |
| 6,266,784 B1 | 7/2001 | Hsiao et al. |
| 6,269,431 B1 | 7/2001 | Dunham |
| 6,275,953 B1 | 8/2001 | Vahalia et al. |
| 6,298,439 B1 * | 10/2001 | Beglin .............................. 713/1 |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii et al. |
| 6,327,612 B1 | 12/2001 | Watanabe et al. |
| 6,328,766 B1 | 12/2001 | Long |
| 6,330,570 B1 | 12/2001 | Crighton |
| 6,330,642 B1 | 12/2001 | Carteau |
| 6,341,287 B1 | 1/2002 | Sziklai et al. |
| 6,343,287 B1 | 1/2002 | Kumar et al. |
| 6,343,324 B1 | 1/2002 | Hubis et al. |
| 6,345,288 B1 | 2/2002 | Reed et al. |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,678 B2 | 7/2002 | Smiga et al. |
| 6,421,711 B1 | 7/2002 | Blumenau et al. |
| 6,442,706 B1 | 8/2002 | Wahl et al. |
| 6,470,332 B1 | 10/2002 | Weschler |
| 6,484,162 B1 | 11/2002 | Edlund et al. |
| 6,487,561 B1 | 11/2002 | Ofek et al. |
| 6,487,644 B1 | 11/2002 | Huebsch et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,540,623 B2 | 4/2003 | Jackson |
| 6,549,918 B1 | 4/2003 | Probert, Jr. et al. |
| 6,557,039 B1 | 4/2003 | Leong et al. |
| 6,564,228 B1 | 5/2003 | O'Connor |
| 6,593,656 B2 | 7/2003 | Ahn et al. |
| 6,618,771 B1 | 9/2003 | Leja et al. |
| 6,629,110 B2 | 9/2003 | Cane et al. |
| 6,647,399 B2 | 11/2003 | Zaremba |
| 6,658,526 B2 | 12/2003 | Nguyen et al. |
| 6,662,218 B2 | 12/2003 | Mighdoll et al. |
| 6,675,177 B1 | 1/2004 | Webb |
| 6,691,232 B1 | 2/2004 | Wood et al. |
| 6,721,767 B2 | 4/2004 | De Meno et al. |
| 6,732,088 B1 | 5/2004 | Glance |
| 6,732,231 B1 | 5/2004 | Don et al. |
| 6,732,244 B2 | 5/2004 | Ashton et al. |
| 6,745,178 B1 | 6/2004 | Emens et al. |
| 6,795,828 B2 | 9/2004 | Ricketts |
| 6,816,941 B1 | 11/2004 | Carlson et al. |
| 6,820,070 B2 | 11/2004 | Goldman et al. |
| 6,839,741 B1 | 1/2005 | Tsai |
| 6,839,803 B1 | 1/2005 | Loh et al. |
| 6,850,994 B2 | 2/2005 | Gabryjelski |
| 6,860,422 B2 | 3/2005 | Hull et al. |
| 6,865,568 B2 | 3/2005 | Chau |
| 6,871,182 B1 | 3/2005 | Winnard et al. |
| 6,892,221 B2 | 5/2005 | Ricart et al. |
| 6,948,038 B2 | 9/2005 | Berkowitz et al. |
| 6,948,039 B2 | 9/2005 | Biessener et al. |
| 6,957,186 B1 | 10/2005 | Guheen et al. |
| 6,970,997 B2 | 11/2005 | Shibayama et al. |
| 6,976,039 B2 | 12/2005 | Chefalas et al. |
| 6,995,675 B2 | 2/2006 | Curkendall et al. |
| 6,996,616 B1 | 2/2006 | Leighton et al. |

(56) References Cited

U.S. PATENT DOCUMENTS

| | | | |
|---|---|---|---|
| 7,003,641 B2 | 2/2006 | Prahlad et al. |
| 7,028,079 B2 | 4/2006 | Mastrianni et al. |
| 7,035,880 B1 | 4/2006 | Crescenti et al. |
| 7,039,860 B1 | 5/2006 | Gautestad et al. |
| 7,058,661 B2 | 6/2006 | Ciaramitaro et al. |
| 7,099,901 B2 | 8/2006 | Sutoh et al. |
| 7,107,298 B2 | 9/2006 | Prahlad et al. |
| 7,107,416 B2 | 9/2006 | Stuart et al. |
| 7,133,870 B1 | 11/2006 | Tripp et al. |
| 7,139,826 B2 | 11/2006 | Watanabe et al. |
| 7,139,846 B1 | 11/2006 | Rossi |
| 7,146,387 B1 | 12/2006 | Russo et al. |
| 7,155,421 B1 | 12/2006 | Haldar |
| 7,155,481 B2 | 12/2006 | Prahlad et al. |
| 7,159,081 B2 | 1/2007 | Suzuki |
| 7,171,468 B2 | 1/2007 | Yeung et al. |
| 7,171,585 B2 | 1/2007 | Gail et al. |
| 7,185,152 B2 | 2/2007 | Takahashi et al. |
| 7,188,141 B2 | 3/2007 | Novaes |
| 7,240,100 B1 | 7/2007 | Wein et al. |
| 7,246,207 B2 * | 7/2007 | Kottomtharayil et al. .... 711/154 |
| 7,269,664 B2 | 9/2007 | Hutsch et al. |
| 7,284,033 B2 | 10/2007 | Jhanji |
| 7,287,047 B2 | 10/2007 | Kavuri |
| 7,290,017 B1 | 10/2007 | Wang et al. |
| 7,313,659 B2 | 12/2007 | Suzuki |
| 7,315,923 B2 | 1/2008 | Retnamma et al. |
| 7,328,325 B1 | 2/2008 | Solis et al. |
| 7,343,453 B2 | 3/2008 | Prahlad et al. |
| 7,346,623 B2 | 3/2008 | Prahlad et al. |
| 7,346,676 B1 | 3/2008 | Swildens et al. |
| 7,346,751 B2 | 3/2008 | Prahlad et al. |
| 7,376,947 B2 | 5/2008 | Evers |
| 7,379,978 B2 | 5/2008 | Anderson et al. |
| 7,383,379 B2 | 6/2008 | Patterson et al. |
| 7,386,535 B1 | 6/2008 | Kalucha et al. |
| 7,395,282 B1 | 7/2008 | Crescenti et al. |
| 7,421,460 B2 | 9/2008 | Chigusa et al. |
| 7,424,543 B2 | 9/2008 | Rice, III |
| 7,434,219 B2 | 10/2008 | De Meno et al. |
| 7,457,790 B2 | 11/2008 | Kochunni et al. |
| 7,472,142 B2 | 12/2008 | Prahlad et al. |
| 7,496,841 B2 | 2/2009 | Hadfield et al. |
| 7,529,782 B2 | 5/2009 | Prahlad et al. |
| 7,565,484 B2 | 7/2009 | Ghosal et al. |
| 7,577,689 B1 | 8/2009 | Masinter et al. |
| 7,577,694 B2 | 8/2009 | Nakano et al. |
| 7,584,469 B2 | 9/2009 | Mitekura et al. |
| 7,587,715 B1 | 9/2009 | Barrett et al. |
| 7,593,935 B2 | 9/2009 | Sullivan |
| 7,596,713 B2 | 9/2009 | Mani-Meitav et al. |
| 7,603,626 B2 | 10/2009 | Williams et al. |
| 7,606,844 B2 | 10/2009 | Kottomtharayil |
| 7,610,285 B1 | 10/2009 | Zoellner et al. |
| 7,617,262 B2 | 11/2009 | Prahlad et al. |
| 7,668,884 B2 | 2/2010 | Prahlad et al. |
| 7,673,175 B2 | 3/2010 | Mora et al. |
| 7,676,542 B2 | 3/2010 | Moser et al. |
| 7,689,899 B2 | 3/2010 | Leymaster et al. |
| 7,730,031 B2 | 6/2010 | Forster |
| 7,734,593 B2 | 6/2010 | Prahlad et al. |
| 7,734,669 B2 | 6/2010 | Kottomtharayil et al. |
| 7,747,579 B2 | 6/2010 | Prahlad et al. |
| 7,751,628 B1 | 7/2010 | Reisman |
| 7,761,409 B2 | 7/2010 | Stefik et al. |
| 7,792,789 B2 | 9/2010 | Prahlad et al. |
| 7,801,871 B2 | 9/2010 | Gosnell |
| 7,814,118 B2 | 10/2010 | Kottomtharayil et al. |
| 7,827,266 B2 | 11/2010 | Gupta |
| 7,831,793 B2 | 11/2010 | Chakravarty et al. |
| 7,840,537 B2 | 11/2010 | Gokhale et al. |
| 7,844,676 B2 | 11/2010 | Prahlad et al. |
| 7,865,517 B2 | 1/2011 | Prahlad et al. |
| 7,882,077 B2 | 2/2011 | Gokhale et al. |
| 7,882,093 B2 | 2/2011 | Kottomtharayil et al. |
| 7,882,097 B1 | 2/2011 | Ogilvie |
| 7,937,393 B2 | 5/2011 | Prahlad et al. |
| 7,937,420 B2 | 5/2011 | Tabellion et al. |
| 7,937,702 B2 | 5/2011 | De Meno et al. |
| 7,984,063 B2 | 7/2011 | Kottomtharayil et al. |
| 8,037,028 B2 | 10/2011 | Prahlad et al. |
| 8,055,627 B2 | 11/2011 | Prahlad et al. |
| 8,060,514 B2 | 11/2011 | Arrouye et al. |
| 8,078,607 B2 | 12/2011 | Oztekin et al. |
| 8,099,428 B2 | 1/2012 | Kottomtharayil et al. |
| 8,108,427 B2 | 1/2012 | Prahlad et al. |
| 8,140,786 B2 | 3/2012 | Bunte et al. |
| 8,156,086 B2 | 4/2012 | Lu et al. |
| 8,161,003 B2 | 4/2012 | Kavuri |
| 8,170,995 B2 | 5/2012 | Prahlad et al. |
| 8,219,524 B2 | 7/2012 | Gokhale |
| 8,229,954 B2 | 7/2012 | Kottomtharayil et al. |
| 8,230,195 B2 | 7/2012 | Amarendran et al. |
| RE43,678 E | 9/2012 | Major et al. |
| 8,285,681 B2 | 10/2012 | Prahlad et al. |
| 8,352,954 B2 | 1/2013 | Gokhale et al. |
| 8,364,652 B2 | 1/2013 | Vijayan et al. |
| 8,578,120 B2 | 11/2013 | Attarde et al. |
| 2002/0032878 A1 | 3/2002 | Karpf |
| 2002/0049883 A1 | 4/2002 | Schneider et al. |
| 2002/0120858 A1 | 8/2002 | Porter et al. |
| 2003/0046313 A1 | 3/2003 | Leung et al. |
| 2003/0050979 A1 | 3/2003 | Takahashi |
| 2003/0101086 A1 | 5/2003 | San Miguel |
| 2004/0039689 A1 | 2/2004 | Penney et al. |
| 2004/0267815 A1 | 12/2004 | De Mes |
| 2005/0039069 A1 | 2/2005 | Prahlad et al. |
| 2005/0097070 A1 | 5/2005 | Enis et al. |
| 2005/0251786 A1 | 11/2005 | Citron et al. |
| 2005/0278207 A1 | 12/2005 | Ronnewinkel |
| 2006/0036619 A1 | 2/2006 | Fuerst et al. |
| 2006/0070061 A1 | 3/2006 | Cox et al. |
| 2006/0115802 A1 | 6/2006 | Reynolds |
| 2006/0116999 A1 | 6/2006 | Dettinger et al. |
| 2006/0149604 A1 | 7/2006 | Miller |
| 2006/0149724 A1 | 7/2006 | Ritter et al. |
| 2006/0224846 A1 | 10/2006 | Amarendran et al. |
| 2006/0265396 A1 | 11/2006 | Raman et al. |
| 2006/0282900 A1 | 12/2006 | Johnson et al. |
| 2007/0022145 A1 | 1/2007 | Kavuri |
| 2007/0028229 A1 | 2/2007 | Knatcher |
| 2007/0043715 A1 | 2/2007 | Kaushik et al. |
| 2007/0061266 A1 | 3/2007 | Moore et al. |
| 2007/0061298 A1 | 3/2007 | Wilson et al. |
| 2007/0136541 A1 | 6/2007 | Herz et al. |
| 2007/0156783 A1 | 7/2007 | Zbogar-Smith et al. |
| 2007/0166674 A1 | 7/2007 | Kochunni et al. |
| 2007/0185915 A1 | 8/2007 | Prahlad et al. |
| 2007/0214330 A1 | 9/2007 | Minami et al. |
| 2007/0226320 A1 | 9/2007 | Hager et al. |
| 2007/0250810 A1 | 10/2007 | Tittizer et al. |
| 2007/0296258 A1 | 12/2007 | Calvert et al. |
| 2008/0126302 A1 | 5/2008 | Mora et al. |
| 2008/0229037 A1 | 9/2008 | Bunte et al. |
| 2008/0243855 A1 | 10/2008 | Prahlad et al. |
| 2008/0282048 A1 | 11/2008 | Miura |
| 2008/0288947 A1 | 11/2008 | Gokhale et al. |
| 2008/0288948 A1 | 11/2008 | Attarde et al. |
| 2008/0320319 A1 | 12/2008 | Muller et al. |
| 2009/0171883 A1 | 7/2009 | Kochunni et al. |
| 2009/0319534 A1 | 12/2009 | Gokhale |
| 2009/0320029 A1 | 12/2009 | Kottomtharayil |
| 2009/0320033 A1 | 12/2009 | Gokhale et al. |
| 2010/0031017 A1 | 2/2010 | Gokhale et al. |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0070726 A1 | 3/2010 | Ngo et al. |
| 2010/0076932 A1 | 3/2010 | Lad |
| 2010/0114837 A1 | 5/2010 | Prahlad et al. |
| 2010/0332456 A1 | 12/2010 | Prahlad et al. |
| 2011/0093471 A1 | 4/2011 | Brockway et al. |
| 2011/0138225 A1 | 6/2011 | Gunabalasubramaniam et al. |
| 2011/0173171 A1 | 7/2011 | De Meno et al. |

(56) References Cited

U.S. PATENT DOCUMENTS

| | | | |
|---|---|---|---|
| 2012/0036108 | A1 | 2/2012 | Prahlad et al. |
| 2012/0150818 | A1 | 6/2012 | Vijayan Retnamma et al. |
| 2012/0150826 | A1 | 6/2012 | Vijayan Retnamma et al. |
| 2012/0254119 | A1 | 10/2012 | Kumarasamy et al. |
| 2012/0265754 | A1 | 10/2012 | Kottomtharayil et al. |
| 2012/0317085 | A1 | 12/2012 | Green et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0910019 A2 | 4/1999 |
| EP | 0981090 A1 | 2/2000 |
| EP | 0986011 | 3/2000 |
| EP | 1035690 | 9/2000 |
| GB | 2216368 A | 10/1989 |
| JP | 07-046271 A | 2/1995 |
| JP | 7073080 A | 3/1995 |
| JP | 8044598 A | 2/1996 |
| JP | 2000035969 | 2/2000 |
| JP | 2003531435 | 10/2003 |
| WO | WO-9513580 A1 | 5/1995 |
| WO | WO-9912098 A1 | 3/1999 |
| WO | WO-00/58865 | 10/2000 |
| WO | WO-0106368 A1 | 1/2001 |
| WO | WO-01/16693 | 3/2001 |
| WO | WO-0180005 | 10/2001 |

OTHER PUBLICATIONS

U.S. Appl. No. 09/609,977, filed Jul. 5, 2000, Prahlad.

U.S. Appl. No. 13/801,625, filed Mar. 13, 2013, Yongtao et al.

PCT International Search Report for International Application No. PCT/US09/32325, date of mailing Mar. 17, 2009, 11 pages.

Pitoura et al., "Locating Objects in Mobile Computing", IEEE Transactions on Knowledge and Data Engineering, vol. 13, No. 4, Jul./Aug. 2001, pp. 571-592.

Rowe et al., "Indexes for User Access to Large Video Databases", Storage and Retrieval for Image and Video Databases II, IS,& T/SPIE Symp. on Elec. Imaging Sci. & Tech., Feb. 1994, pp. 1-12.

Matthews, Jeanna, et al. "Data protection and rapid recovery from attack with a virtual private file server and virtual machine appliances." Proceedings of the IASTED International Conference on Communication, Network and Information Security (CNIS 2005). 2005.

Quinlan, Sean. "A cached worm file system." Software: Practice and Experience 21.12 (1991): 1289-1299.

Wu, Chin-Hsien, Tei-Wei Kuo, and Li-Pin Chang. "Efficient initialization and crash recovery for log-based file systems over flash memory." Proceedings of the 2006 ACM symposium on Applied computing. ACM, 2006.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, Jun. 12-16, 1994, pp. 124-126.

Extended European Search Report for Application No. EP 09767119, Mail date Feb. 11, 2013, 12 pages.

Gait, J., "The Optical File Cabinet: A Random-Access File System for Write-Once Optical Disks," *IEEE Computer*, vol. 21, No. 6, pp. 11-22 (Jun. 1988).

Hennessy et al., "Computer Architecture—A Quantitative Approach", 2nd Edition, 1996, pp. 246-250.

Rosenblum et al., "The Design and Implementation of a Log-Structured File System," *Operating Systems Review SIGOPS*, vol. 25, No. 5, New York, US, pp. 1-15 (May 1991).

Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.

\* cited by examiner

DATA STORAGE RESOURCE ALLOCATION BY EMPLOYING DYNAMIC METHODS AND BLACKLISTING RESOURCE REQUEST POOLS

CROSS-REFERENCE TO RELATED APPLICATION(S)

This application is a continuation of U.S. patent application Ser. No. 12/142,445, filed Jun. 19, 2008 (now U.S. Pat. No. 8,352,954), which is herein incorporated by reference in its entirety.

BACKGROUND

Systems used to perform data storage operations of electronic data are growing in complexity. However, current systems may not be able to accommodate increased data storage demands or efficient and timely restore operations. Often, these systems are required to store large amounts of data (e.g. all of a company's data files) during a time period known as a "storage window." The storage window defines a duration and actual time period when the system may perform storage operations. For example, a storage window may be for twelve hours, between 6 PM and 6 AM (that is, twelve non-business hours). Often, storage windows are rigid and unable to be modified. Therefore, when data storage systems attempt to store increasing data loads, they may need to do so without increasing the time in which they operate. Additionally, many systems perform daily stores, which may add further reliance on completing storage operations during allotted storage windows.

Moreover, each data storage operation requires multiple resources, such as access to a tape drive, allocation of a stream for that tape drive, an available tape on which to store data, a media agent computer to process and monitor the request, and so forth. Given multiple data storage requests and multiple resources, with each request requiring different resources for different periods of time, optimizing allocation of these resources can be a very complex operation as the number of requests and resources grow. Processor time can grow exponentially as the requests and resources grow.

Multidimensional resource allocation is an inherently complex problem to solve. As noted above, a number of disparate resources need to be available to satisfy a single request, such as available media, a compatible drive from a pool of drives, etc. Also, additional constraints must be satisfied, such as a load factor on a computer writing the data, a number of allowed agents or writers to a target media (e.g., disk or tape), etc.

Rules of resource allocation further complicate the problem. For example, rules may be established regarding failover such that when a given drive fails, the system can substitute in another drive. Likewise, rules may be established for load balancing so as not to overtax a given drive, but to spread the burden over a pool of drives. If a primary resource candidate is not available, then the system may allocate resources from an alternate resource pool, which may or may not be satisfactory. Time delay factors arise when alternatives are considered.

Furthermore, resource requests arrive in a random order; however, each incoming request has either a pre-assigned or dynamically changing priority. Furthermore, resources are freed up in a random order and may be associated with lower priority requests. A multiple set matching algorithm is not possible in such a complex environment.

In order to make a best match, a sorted list of requests is often maintained. This queue of requests is then walked and resources allocated to higher priority requests first before lower priority requests can be honored. The matching process for each request is very time consuming given the number of resources that must be made available for each job.

Prior systems have attempted to ameliorate these problems by reducing the number of variables and thereby reducing the complexity of such optimizations of resource allocations. Other systems have employed dedicated resources, often for higher priority requests. However, when those resources become freed up, they sit idle until other requests dedicated to those resources arrive. Other systems have solved this complexity problem by simply reducing the number of requests and creating smaller units of resources. This fragments a system, and can be inefficient.

Requests in a data management system often ultimately fail. For example, a required resource may be down or in short supply. Unfortunately, the data management system has often committed significant resources in the resource allocation process before the request fails. For example, the data management system may spend precious time gathering other resources or data only to discover that the tape drive to which the data should be copied is not available. This causes the data management system to waste time that reduces the amount of productive work that the system can perform during the storage window.

The foregoing examples of some existing limitations are intended to be illustrative and not exclusive. Other limitations will become apparent to those of skill in the art upon a reading of the Detailed Description below. These and other problems exist with respect to data storage management systems.

Figure 1A:
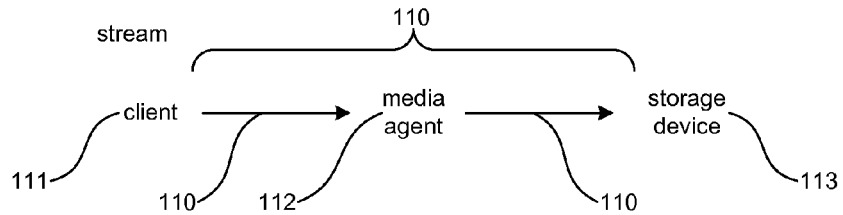
FIG. 1A is a block diagram illustrating an example of components used in data storage operations.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 420 is first introduced and discussed with respect to FIG. 4).

The headings provided herein are for convenience only and do not necessarily effect the scope or meaning of the claimed invention.

DETAILED DESCRIPTION

Described in detail herein is a resource allocation system that may employ one or more resource optimization subsystems or routines, which may be used individually or collectively to provide resource allocation in a data storage management environment. The system helps match resources in a multidimensional data storage management environment in a more efficient fashion, which permits highly scalable systems. As systems grow, a queue of jobs grows. For example, a queue may include thousands of data storage jobs, where each job is associated with multiple resource requests. Improving the allocation of resources enables more jobs to be performed within a particular time window, such as overnight or during off-peak hours for a business.

In some embodiments, the resource allocation system begins with an ordered plan for matching requests to resources that is sorted by priority. The initial priority scheme may be determined in a variety of ways. For example, an administrator may determine which items are most important and give those items a higher priority. As another example, the system may prioritize requests according to geographic or network routing, such as by establishing a preference for satisfying a request with the closest computer to a computer holding data for a request. The resource allocation system attempts to respect the input priority, and will prefer to complete higher priority requests before lower priority requests. The initial ordered plan forms a starting point that the system can refine by each of the methods described herein.

The resource allocation system uses three primary methods for matching resources to requests that are described in further detail in the following sections: Preordered/Intelligent Resource Checks, Category Blacklisting, and Resource Holding Area. The Dynamic Routing/Allocation section below describes additional techniques for matching requests to resources.

One resource optimization routine employs abbreviated pre-ordered matching where only a subset of resources are checked in a pre-ordered fashion. For example, physical resources such as drives are in short supply so checks of these resources are quick given their small numbers, and their tendency to more frequently fail. Thus, physical checks are done first, then logical checks performed later, so that when a physical resource fails, it saves the system time it may have spent checking longer lists of logical resources. If a request fails based on a check of this shortened list, then the system moves to the next request in a queue.

As the requests for individual resources grow into the thousands or tens of thousands, and the number of resources grows to the hundreds, even an abbreviated matching list can consume considerable processing cycles. Therefore, a second resource optimization routine, category blacklisting, provides further efficiencies and scale to a queue of potentially thousands of jobs with their associated resource requests by assigning requests with a category code, such as a storage policy. All resource requests having the same category code are associated with the same set of resource requests and rules that govern how to allocate those resources. Once a request is denied, the entire category is blacklisted or otherwise excluded from future resource allocation requests. Thus, subsequent requests in the same category may not even matched or analyzed by the system based on a blacklisting flag associated with that request.

A third resource optimization routine employs a temporary holding area for released resources to preserve priorities. Since resources are released back into a pool of available resources at random times, the problem arises that a request having a lower priority will receive that resource ahead of a request having a higher priority. To overcome this shortcoming, released resources are held in a temporary holding area. When the resource allocation system loops back to the top of the queue (i.e., to those unfulfilled requests having the highest priority), the newly available resources from the temporary holding area are added back to the general pool of available resources. This helps insure that requests having higher priority will have access to any released resources before lower priority requests.

Various examples of the system will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1A, a block diagram illustrating components of a data stream is shown. The stream 110 may include a client 111, a media agent 112, and a secondary storage device 113. For example, in storage operations, the system may store, receive and/or prepare data to be stored, copied or backed up at a server or client 111. The system may then transfer the data to be stored to media agent 112, which may then refer to storage policies, schedule policies, and/retention policies (and other policies), and then choose a secondary storage device 113 for storage of the data. Secondary storage devices may be magnetic tapes, optical disks, USB and other similar media, disk and tape drives, and so on.

Figure 1B:
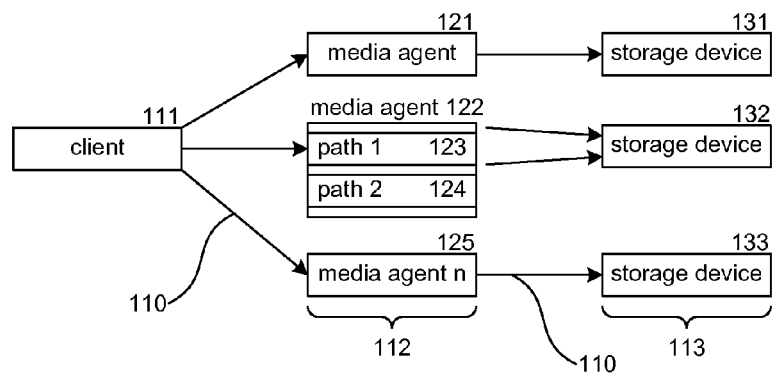
FIG. 1B is a block diagram illustrating an alternative example of components used in data storage operations.

Referring to FIG. 1B, a block diagram illustrating components of multiple selectable data streams is shown. Client 111 and any one of multiple media agents 112 may form a stream 110. For example, one stream may contain client 111, media agent 121, and storage device 131, while a second stream may use media agent 125, storage device 133, and the same client 111. Additionally, media agents may contain additional subpaths 123, 124 that may increase the number of possible streams for client 111. Examples of subpaths 123, 124 include host bus adapter (HBA) cards, Fibre Channel cards, SCSI cards, and so on. Thus, the system is able to stream data from client 111 to multiple secondary storage devices 113 via multiple media agents 112 using multiple streams.

Figure 1C:
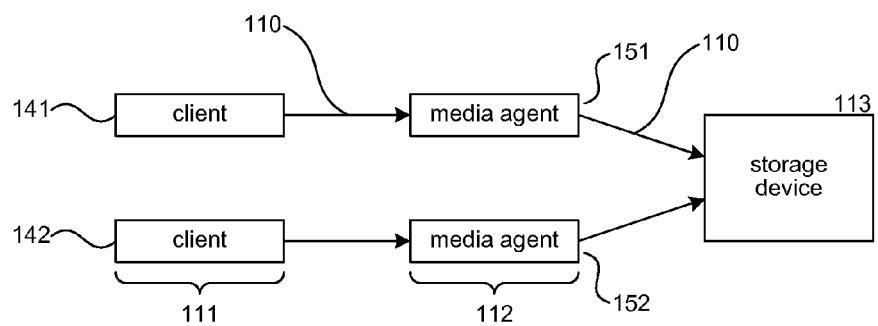
FIG. 1C is a block diagram illustrating an alternative example of components used in data storage operations.

Referring to FIG. 1C, a block diagram illustrating components of alternative multiple selectable data streams is shown. In this example, the system may transfer data from multiple media agents 151, 152 to the same storage device 113. For example, one stream may be from client 141, to media agent 151, to secondary storage device 113, and a second stream may be from client 142, to media agent 152, to secondary storage device 113. Thus, the system is able to copy data to one secondary storage device 113 using multiple streams 110.

Additionally, the system may stream may be from one client to two media agents and to one storage device. Of course, the system may employ other configurations of stream components not shown in the Figures.

Figure 2:
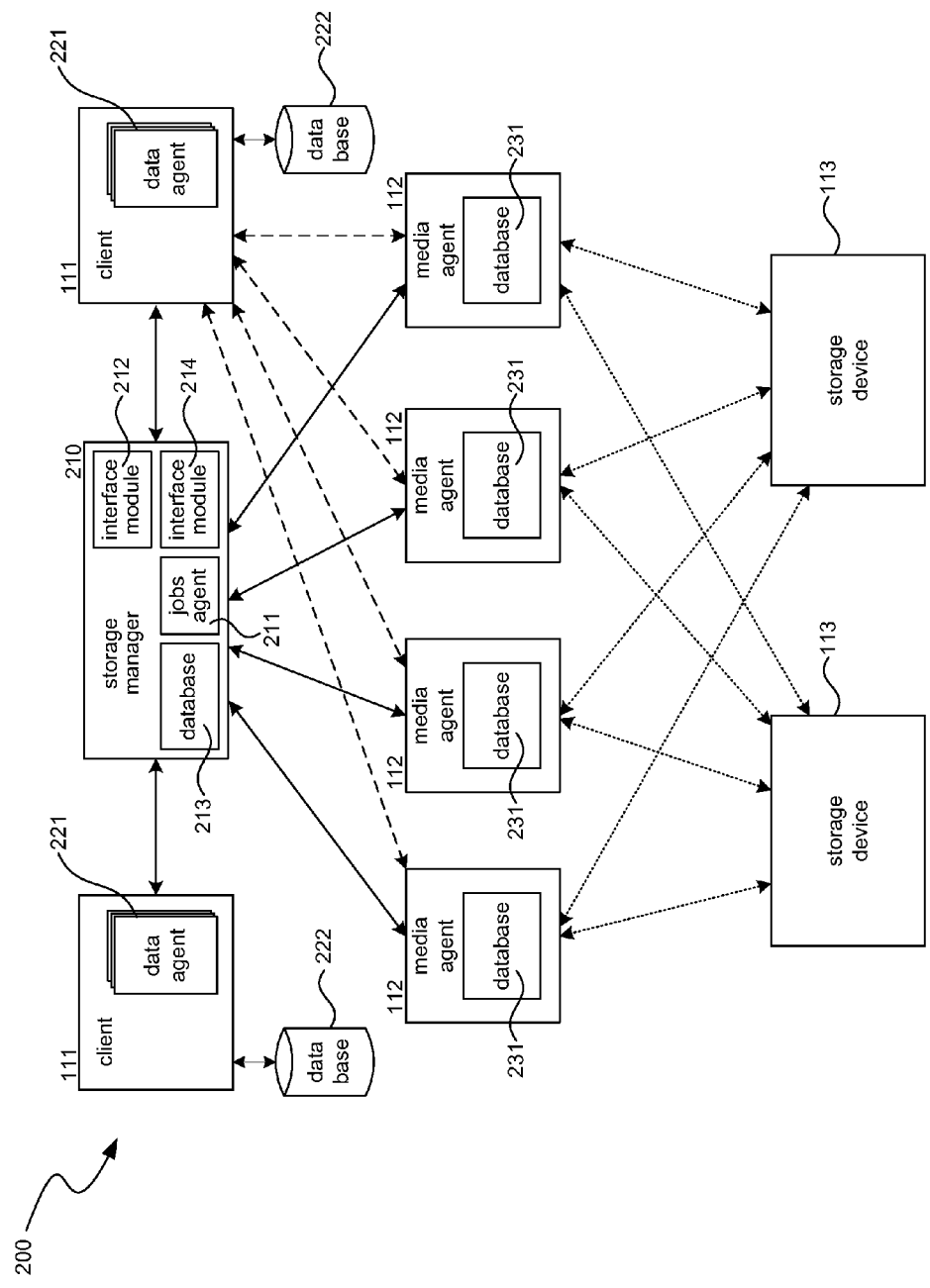
FIG. 2 is a block diagram illustrating an example of a data storage system.

Referring to FIG. 2, a block diagram illustrating an example of a data storage system 200 is shown. Data storage systems may contain some or all of the following components, depending on the needs of the system.

For example, the data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. Client databases 222 may contain data files and other information, while media agent databases may contain indices and other data structures that assist and implement the storage of data into secondary storage devices, for example.

The data storage system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. The data copies may include snapshot copies, backup copies, HSM copies, archive copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set preferences about how the system transfers data to the location and what processes the system performs on the data before, during, or after the data transfer. Storage policies may be stored in storage manager 210, or may be stored in other resources, such as a global manager, a media agent, and so on. Further details regarding storage management and resources for storage management will now be discussed.

Figure 3:
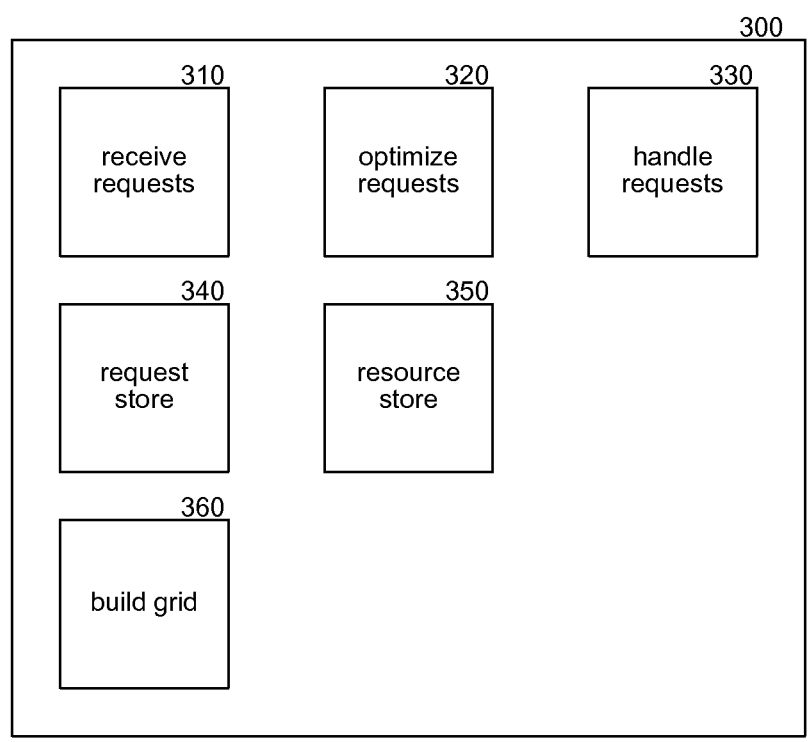
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to primary or secondary storage. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs).

The server 300 contains various components of the resource allocation system such as a receive requests component 310, an optimize requests component 320, a handle requests component 330, a request store component 340, a resource store component 350, and a build grid component 360. The receive requests component 310 provides input to the resource allocation system in the form of an initial priority ordered plan (e.g., a list or queue) that specifies requests to be performed by the system. The optimize requests component 320 modifies the initial plan by performing one or more optimization routines on the initial plan. For example, the resource allocation system may perform abbreviated checks to remove requests from the initial plan that would fail. The handle requests component 330 dispatches, performs or at least initializes each request and performs other optimizations based on the result of each request. For example, when a request fails, the handle requests component 330 may remove similar requests from the plan, such as by blacklisting categories of requests. The request store component 340 stores the request plan and supplemental information about each request, such as any associated storage policy or metadata. The resource store component 350 stores information about the resources available throughout the system, such as drives, networks, media, and so forth. The build grid component 360 builds a grid of resources and requests by subdividing resources and requests according to certain criteria, such as geographic location of resources. These components and their operation are described in further detail herein.

Storage operations cells may by organized in a hierarchical fashion to perform various storage operations within a network. Further details on such a hierarchical architecture may be found in U.S. patent application Ser. No. 11/120,662, entitled Hierarchical Systems and Methods for Providing a Unified View of Storage Information, filed May 2, 2005, which is hereby incorporated herein by reference.

Preordered/Intelligent Resource Checks

The resource allocation system or process matches pending requests to resources by performing abbreviated checks to determine if a request would succeed. If a check fails, then the resource allocation system can move on to the next request, having spent less time than if the system began performing the data storage operation specified by the request in full (e.g., not abbreviated) and the data storage operation failed. The resource allocation system performs the abbreviated checks in a preordered fashion. For example, physical checks (e.g., determining whether the necessary hardware is working) may be performed before logical checks (e.g., determining whether a device is in use). An underlying goal is to check requests that have the highest chance of failure to remove them from the plan first. In addition, since many requests have dependent requests, when the resource allocation system can eliminate a request from the plan, it can also remove each of the request's dependent requests. Requests that fail the checks would have failed anyway, so determining that before resources have been committed and time has been wasted allows the system to spend more time working on requests that are more likely to succeed.

In one example, since physical resources are often the most difficult to acquire or fulfill, the matching routine may analyze a current job in a queue and first recognize that one resource being requested is a tape drive. Typically, physical resources like disks or tape drives are in short supply. The matching routine may perform a physical check to see whether that physical resource (tape drive) is offline or malfunctioning (a physical check) before doing a logical check of that resource (e.g., whether it is busy with another job). Likewise, the matching process may look at the state of the network to determine whether a path or stream is possible to satisfy a currently analyzed job. Physical checks are often faster than logical checks as they operate on a smaller list of available resources and tend to fail more often. When a physical check fails, the resource allocation system saves time that might have been wasted if a longer logical check had been performed first.

The following is an example of physical checks that may be performed by the resource allocation system in the following order:
1) availability of drives (e.g., tape, optical, or magnetic),
2) availability of device streams that can be used on the storage policy,
3) availability of a tape library, availability of a media agent,
4) availability of a host bus adapter card, number of drives that can be used in parallel from a tape library (e.g., a drive allocation policy for a library),
5) number of drives that can be used on a single media agent at a given time (e.g., a drive allocation policy for a drive pool),
6) availability of tapes or other media, and so forth.

The resource allocation system next performs logical checks. For example, the system may determine whether a tape drive is busy or flagged do not use. Some devices may be reserved for other purposes outside of the resource allocation system such as an administrator indicating that the resource allocation system should not schedule requests to use those devices.

In some embodiments, the resource allocation system compares only a subset of resource requests for that job to available resources to determine whether that job can be satisfied. A resource allocation system or process may include an abbreviated pre-order matching routine that identifies a subset of resource requests and performs a matching or allocation based on only that subset, rather than the entire set of resources. Notably, if the matching routine determines, based on an ordered review of a subset of resource requests in a given job, that that job cannot be satisfied, then the matching routine may stop any further matching operations for that job and simply move to the next job in the queue. This saves valuable resources in determining how to optimize each job (with its associated resource requests) in the queue. Rather than try to satisfy requests, the matching routine looks to eliminate jobs that request resources that cannot currently be satisfied.

Thus, the matching routine in one example reviews each incoming job in the queue, in order, and determines whether that job can be skipped, ignored or excluded during a current cycle through the queue. The matching routine compares the various resource requests in the job to the resources above to see whether that current job can be ignored. For example, a current job analyzed by the matching routine may request the following resources: an available tape drive, a device stream for a storage policy, access to a tape library, a particular media agent, and an available tape. The matching routine first determines whether a tape drive is physically available, and if so, determines whether a device stream to that tape drive for the storage policy is available. If not, then the matching routine does not look to determine whether any other resources in the job are available, but simply moves to the next job in the queue.

Figure 4:
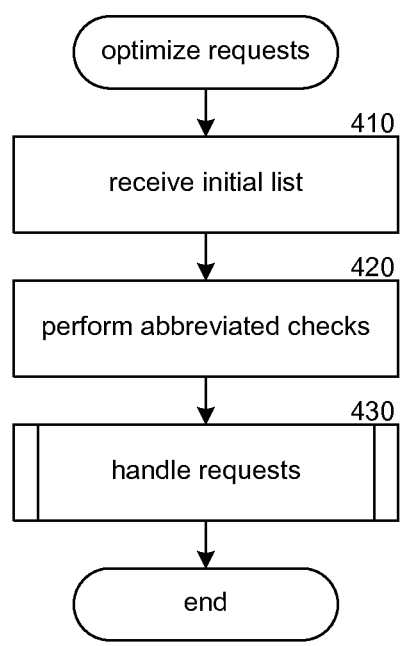
FIG. 4 is a flow diagram illustrating an example optimize requests routine.

FIG. 4 is a flow diagram that illustrates the processing of the optimize requests component, in one embodiment. The component is invoked when the resource allocation system receives an initial plan containing a prioritized list of data storage requests. The plan may come from a variety of sources. For example, an administrator may create the initial plan that is composed of each of the storage requests that the administrator wants a data storage system to perform. As another example, each computer in an organization may automatically register a nightly request to archive files or perform other data storage operations, and a data storage system may collect the requests. In block 410, the component receives the initial list of requests. The list of requests is in priority or other order, based on requirements of the data storage system for completing the requests. For example, an administrator may order requests based on the importance that each request be completed. In block 420, the component performs the abbreviated checks described above. For example, the component may perform a series of physical checks for each request followed by a series of logical checks (and the checks may only check a subset of the resources required by the request). When a request fails a particular check, the request is removed from the list or marked as not to be performed. In block 430, the component handles each request in turn by traversing the list as described in further detail with respect to FIG. 5.

Under the abbreviated or preordered/intelligent check of resources, the system performs one or more abbreviated checks by performing a selected subset of one or more checks for whether one or more selected data storage resources are available to satisfy a data storage request. As noted above, the selected one data storage resource may be a physical data storage resource, rather than a logical data storage resource. When the one or more abbreviated checks indicate that the data storage request would fail if performed, then the system updates the list of data storage requests to indicate that that data storage request should not be performed, without attempting to perform that data storage request and without performing a check of all data storage resources required for performing that data storage request. Thereafter, the system again performs one or more abbreviated checks on the next data storage request in the list of data storage requests, and updates the list when the newly performed abbreviated checks indicate that this next data storage request would fail if performed.

When the abbreviated pre-ordered checks are complete, the resource allocation system will have reduced the initial ordered plan by removing requests from the plan that would eventually fail if allowed to continue. The number of requests removed can be significant, leading to significant time savings and more time for the resource allocation system to spend on requests that will likely succeed.

Category Blacklisting

The second method the resource allocation system uses for matching resources to requests is called category blacklisting. As the request count and number of resources grow, even the abbreviated checks described above may take a long time. Category blacklisting attempts to make the process of matching resources to requests more efficient so that the system scales further. This process is described in further detail with reference to FIG. 5.

In some embodiments, each request has a category code. For example, the category code may be associated with a storage policy. All requests in the same category have similar resource requirements and rules governing how to allocate the resources. When the resource allocation system denies a request, either during abbreviated checking or by actually attempting to perform the request and reaching a point of failure, then the resource allocation system blacklists the entire category. If one request in the category fails then all of the requests in the category are likely to fail. By removing these other requests, the resource allocation system prevents wasting time on failed requests and has more time available to perform requests that will likely succeed.

In some embodiments, the resource allocation system determines a likeness factor that indicates a degree of similarity between requests assigned to a particular category. If the resource allocation system denies a request, then the resource allocation system removes other requests that have a high enough likeness factor from the plan. The likeness factor considers a subset of resources that the request needs, and may separate the resources into common and unique subsets. The resource allocation system may take two or three of the most common resources to compose the likeness factor. If a request is denied for a common resource, then the resource allocation system blacklists the category. However, if the request is denied based on a unique resource, then it is less likely that the entire category will suffer the same failure, and the resource allocation system may not blacklist the category.

When the category blacklisting process is complete, the resource allocation system will have further reduced the ordered plan by removing requests from the plan that would eventually fail if allowed to continue. The number of requests removed can be significant, leading to significant time savings and more time for the resource allocation system to spend on requests that will likely succeed.

Resource Holding Area

To preserve priorities in the job queue, the resource allocation system may employ a temporary holding area for released resources. As jobs are completed, resources are freed up to be available for subsequent job requests. However, as noted above, the freed up resources could be provided to lower priority jobs. Therefore, when resources are freed up, the resource allocation system places them into a logical holding area. They remain in the holding area until the resource allocation system has walked the queue and returns to the top of the queue. At that point, the resource allocation system starts afresh and may satisfy highest priority job requests with all available resources, including those that had been freed up while walking the queue and placed temporarily in the holding area.

In general, the resource allocation system operates in a loop repeatedly traversing the ordered plan of requests and initiating each request in turn as the resources required by the request are available. When the end of the plan is reached, the system starts again from the top. However, a problem arises when a request with lower priority attempts to grab a resource ahead of a request with higher priority. This can happen as the system is traversing the plan when a particular request completes that releases resources that caused a request earlier in the plan to be postponed. Thus, when resources are released by a request, the resource allocation system may place these resources into a temporary resource holding area so that they are not yet available to subsequent requests in the plan. When the resource allocation loop returns to the top of the plan, the resource allocation system makes these resources available to all requests. This ensures that requests with highest priority will have access to any released resources first.

In some embodiments, the resource allocation system receives configuration information from an administrator that alters the behavior of the resource holding area. For example, the configuration information may indicate that the resource holding area is not used until the resource allocation system is at a certain depth in the plan or queue. As an example, if the resource allocation system is at the third request in the plan and the second request released a resource that the third request needs, then the resource allocation system may go ahead and give the resource to the third request rather than waiting until the entire plan has been traversed. It is less likely that any of the prior higher priority requests in the plan need the resource or the resource may be available again by the time the resource allocation system has traversed the entire plan.

The resource allocation system may include an administrator interface (not shown) that allows a system administrator to configure the holding area. For example, if a resource is freed up while the system is analyzing the first quarter or tenth of the queue, then it may be immediately placed back into the pool of available resources, rather than waiting for the entire queue to be walked. As another example, if the resource allocation system is currently analyzing the third request in the queue, and that third request may be satisfied with a resource in the temporary holding area, then the system may allocate that resource from the temporary holding area. Alternatively or additionally, the user interface may permit the system administrator to otherwise allow a resource from the temporary holding area to be placed into the available resource pool based on wait times or otherwise override default operation.

Figure 5:
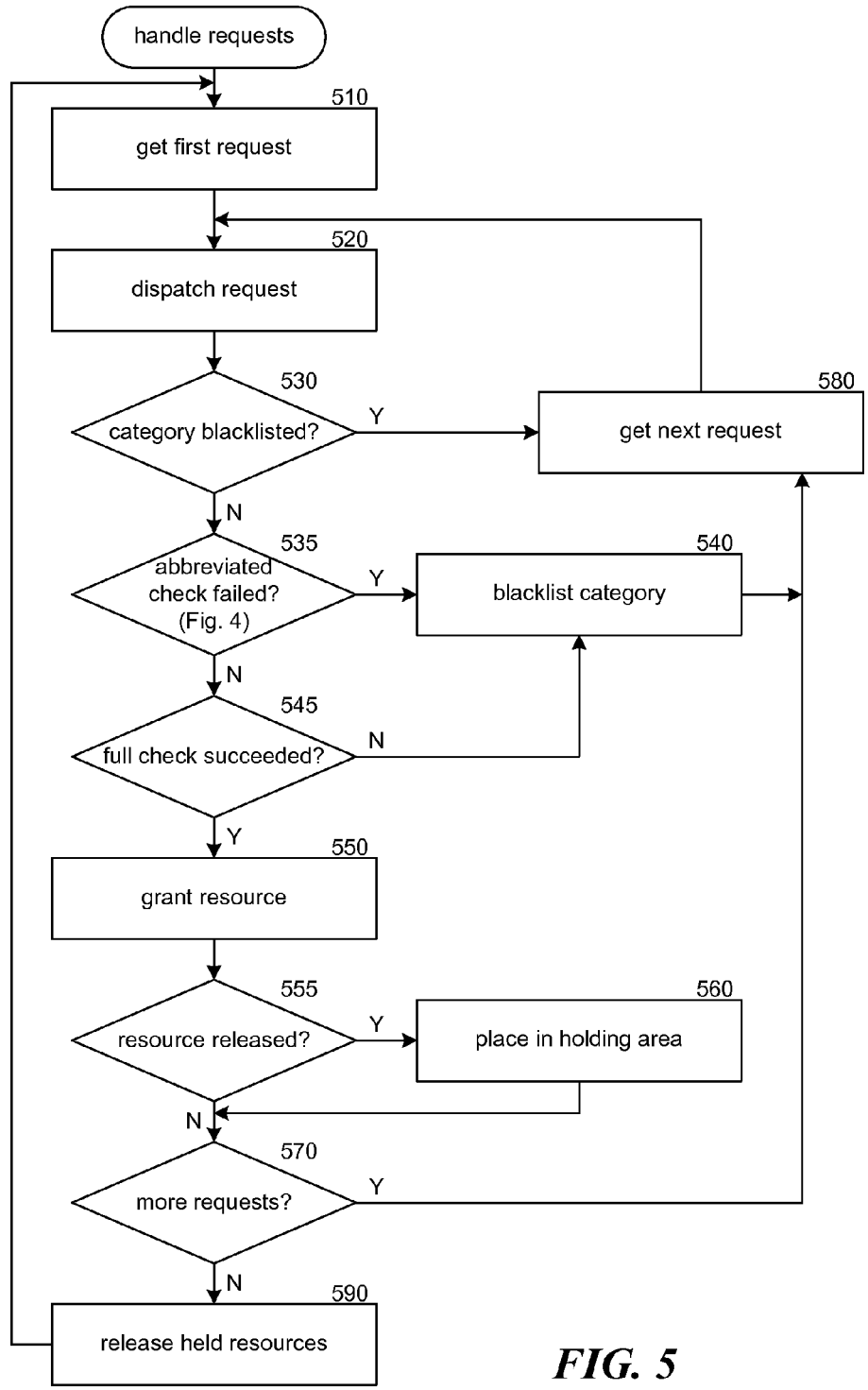
FIG. 5 is a flow diagram illustrating an example handle requests routine.

FIG. 5 illustrates the processing of the handle requests component, in one embodiment. The component is invoked to traverse the list of requests and perform each request. In block 510, the component retrieves the first request from the list. In block 520, the component dispatches the request. Those of ordinary skill in the art will recognize that dispatching a request may include many steps, such as retrieving media from a media library, loading the library in a disk drive, gathering data from one or more computer systems, performing data management operations on the data (e.g., compression, encryption, copying, etc.), and so forth. In decision block 530, the component determines whether the requested resource has been blacklisted by comparing the request to the generated blacklist table. If it is, then the routine proceeds in getting the next request in block 580 and loops back to again dispatching the request in block 520.

If the requested resource is not blacklisted, then in block 535 a component performs one or more abbreviated checks, as described above with respect to FIG. 4. If the check fails, then the component continues at block 540, else the component continues at block 545. In block 540, the component determines the category of the failed request and adds the category to a blacklist so that other requests that belong to the category will be flagged as likely to fail and thus not be dispatched by the resource allocation system. In some embodiments the resource allocation system first determines if the resource that caused the request to fail is common (e.g., such that other similar resources are readily available) or unique, and only blacklist the category if the resource is a unique resource.

In decision block 545, the component performs a full check, and if that fails, the routine again loops back to adding the request to the blacklist category (block 540), getting the next request (block 580), and dispatching the request (block 520). If the full check succeeds, then the resource request is granted in block 550.

In decision block 555, if the request released resources, then the component continues at block 560, else the component continues at block 570. In block 560, the component places the released resources in a temporary resource holding area for release after the entire list has been traversed. This prevents lower priority requests at the end of the list from grabbing resources that higher priority requests at the beginning of the list are waiting for. In decision block 570, if there are more requests in the list, then the component continues at block 580, else the component continues at block 590. In block 580, the component retrieves the next request from the list and loops to block 520 to dispatch the request. Blocks 510-580 depict dispatching requests serially (e.g., one after the other) in order to simplify the illustration of the operation of the resource allocation system. Those of ordinary skill in the art will recognize that in practice many requests can be performed parallel. In block 590, the component has reached the end of the list and releases any temporarily held resources into a global resource pool for access by any request. The component then loops to block 510 to traverse the list again. Typically the resource allocation system will loop repeatedly performing each request remaining in the list until either the list of requests is exhausted or the end of the storage operation window is reached. For example, the system may stop performing requests at the end of a nightly storage window.

Dynamic Routing/Allocation

Often resources are far flung geographically and throughout a network. For example, a company may have multiple offices each with their own LAN and data management resources. The company may want to perform periodic data management operations at each of the offices. For example, the company may backup user workstations at every office on a weekly basis.

In some embodiments, the resource allocation system forms a set of resources needed by requests in a grid, table or other fashion to match up a set of resources that can best satisfy a request. For example, although any tape library accessible by a user workstation could be used to satisfy a request to backup the user workstation, it is likely desirable to use a tape library that is close to the user workstation (where close could include geographic or network proximity). The resource allocation system may group the data management operations based on a created logical table or grid allocation criteria. For example, the criteria may specify different subsets of data that are important to a particular user of the system. For example, a bank may divide data by branch location or other criteria, or a government office may divide data by the level of security clearance needed to access the network on which the data is originally stored.

In some embodiments, the grid indicates alternate data paths that the resource allocation system can use if a preferred resource fails or is unavailable. The data path may specify a particular network route, tape library, media agent, or other hardware or software to use if that data path is selected to satisfy a request. For example, if there is a failover or load issue during the completion of a request, then the resource allocation system can attempt to use one of the alternate data paths. The resource allocation system may determine if all of the elements of a particular data path are available before choosing the alternate data path.

In some embodiments, the resource allocation system receives rules that specify how alternate data paths are chosen. For example, an overflow rule may specify that when a particular data path or hardware resource is full, requests for the data path should failover to a second specified data path. Alternatively or additionally, a rule may specify that the resource allocation system should select data paths in an alternating or round robin fashion to spread the load of requests evenly across data paths, or among lesser used resources to evenly spread wear out among all components.

Figure 6:
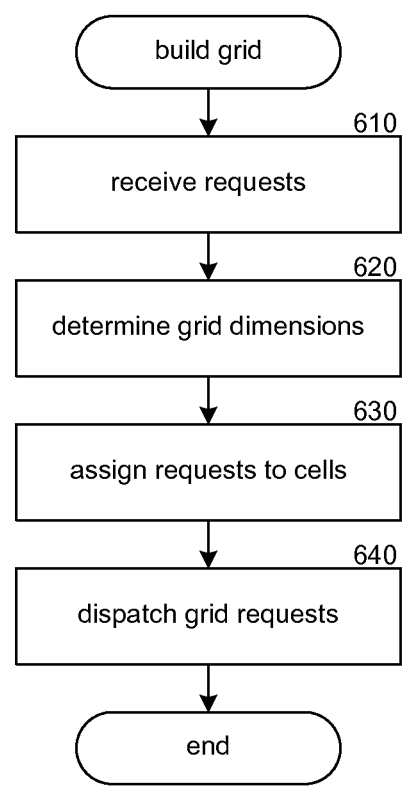
FIG. 6 is a flow diagram illustrating an example build grid routine.

FIG. 6 is a flow diagram that illustrates the processing of the build grid component, in one embodiment. In block 610, the component receives an initial request plan as described above. In block 620, the component determines the grid dimensions. For example, the component may group the resources in columns according to common characteristics of the resources, such as geographic proximity, network topology, departments within an organization, and so forth. Then, rows of requests may be assigned to each column. In block 630, the component assigns requests to the appropriate cell within the grid. For each request, the component may assign the request based on the resources required by the request or other configured criteria. The component may also determine an alternate set of resources for a request to be used when a first set of resources is not available. The methods described above for optimizing the allocation of requests to resources may be used to optimize the entire grid or columns of resources within the grid. In block 640, the component dispatches the requests within the grid. Each column of the grid may operate independently on separate lists of requests, and the component may process each list in parallel as well as performing operations within each list in parallel.

Alternatively or additionally, the grid may include a row or column of priorities associated with each data management operation in a list of data management operations. The system may then perform data management operations along one dimension of the grid in priority order. Overall, the resource allocation system provides a highly scalable data storage system.

The resource allocation system can use the division of resources and requests into a grid to further subdivide the problem of matching requests to resources. Within each dimension of the grid, the resource allocation system may apply the techniques described above for reducing the number of requests to be performed or the resources used for completing those requests. Thus, the grid store provides additional scalability for performing data management operations.

Figure 7:
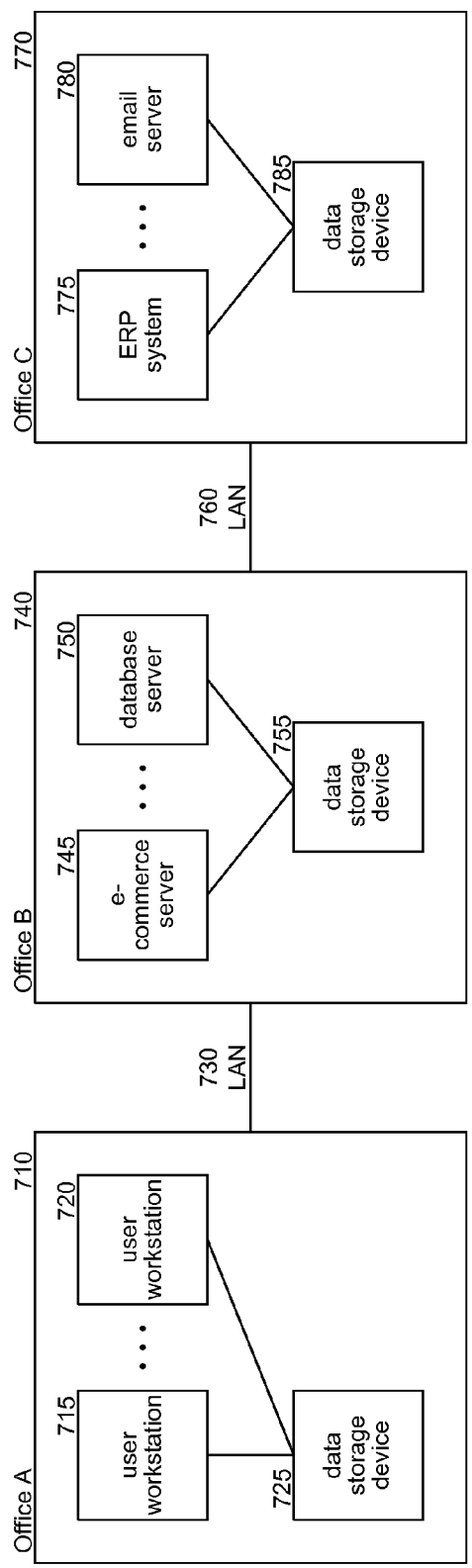
FIG. 7 is a block diagram illustrating an example environment in which a grid store may be applied.

FIG. 7 is a block diagram that illustrates an example environment in which the grid store may be applied. An organization may have three offices: Office A 710, Office B 740, and Office C 770. The offices are connected by one or more networks, such as LAN 730 and WAN 760 (e.g., the Internet). Each office has its own computer systems and data storage devices (e.g., tape libraries, media agents, disk drives, and so forth). For example, Office A 710 has one or more user workstations 715 and 720 and one or more data storage devices such as device 725, whereas Office B contains an E-Commerce server 745 (such as a website) and a database server 750. Office B also has one or more data storage devices, such as device 755. Office C has an ERP system 775 and email sever 780 and one or more data storage devices, such as device 785. Typically, it is desirable to allow the data storage devices at each location handle the data storage requests for that location. For example, the data storage device 725 is typically the preferred device for handling data storage requests related to workstation 715. However, because each office is connected by a network, it is also possible for data storage device 755 to handle data storage requests related to workstation 715. The resource allocation grid divides requests among the available resources, tracking the types of preferences described. In addition, the resource allocation grid may specify one or more alternate data paths to be used when the preferred data path or data storage device is not available.

Overall, this system receives data storage requests to be performed in, e.g., multiple, geographically separated locations, wherein each of the locations includes separate data storage resources. For each data storage request, and before receiving data storage requests to be executed, the system determines at least two different sets of data storage resources to handle the request. The first set of data storage resources is a preferred set of resources to handle the request, while the second set is an alternate set of data storage resources to handle the request. Before receiving data storage requests to be executed, the system establishes a data storage resource allocation based at least in part on one of the sets of data storage resources determined to handle each data storage request.

Likewise, the system receives a list of multiple data management resources for use in performing multiple data management operations and intelligently allocates those resources. For at least some of the multiple data management resources, the system determines characteristics of the data management resource (e.g. geographic proximity, network topology, departments within a business organization, type of hardware, etc.) and groups at least two of the resources based on a similar characteristic. For each data management operation in the list, the system then determines a location of one or more data objects affected by the data management operation, and creates a logical table for allocating the data management resources. This logical table for resource allocation selects one or more data management resources to perform each of the multiple data management operations in the list, based at least in part on the determined physical location of the one or more data objects affected by the data management operation, and on the grouping of at least two of the data management resources based on a similarity of determined characteristics. Thereafter the system may perform each data management operation based on the created logical table for resource allocation.

CONCLUSION

The resource allocation system described herein provides a tremendous amount of flexibility. It is applicable to heterogeneous networks and systems, as well as systems that grow in size and diversity. Thus, a data management system with only a few localized cells may grow 10 or 100 times larger with multiple geographically disbursed cells, without compromising on backup windows and resource allocation times. For example, prior systems could accommodate 300 resource allocations in an hour, but under the present system, could handle over 40,000.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While certain aspects of the technology are presented below in certain claim forms, the inventors contemplate the various aspects of the technology in any number of claim forms. For example, while only one aspect of the technology is recited as a means-plus-function claim under 35 U.S.C. §112, other aspects may likewise be embodied as a means-plus-function claim. Accordingly, the inventors reserve the right to add additional claims after filing the application to pursue such additional claim forms for other aspects of the technology.

The above detailed description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system having a processor for dynamically assigning data storage requests to data storage resources, the system comprising:
   a means for receiving an initial request plan specifying how an alternate data path is to be chosen when preferred data storage resources are not available;
   a means for building a grid allocation table by grouping data storage resources in columns or rows of the grid allocation table according to common characteristics of the data storage resources;
   a means for assigning, when preferred resources are available, a row or column, respectively, of the grid allocation table to a data allocation request using preferred data storage resources;
   a means for assigning, when preferred data storage resources are not available, an alternate set of data storage resources to the data storage request;
      wherein each column or row of the grid allocation table operates independently on separate data storage requests;
   a means for determining whether requested resources from a failed request comprise common or unique resources; and
   a means for selectively adding the failed request to the blacklist table when the failed request corresponded to a common resource, and not adding the failed request to the blacklist table when the failed request corresponded to a unique requested resource.

2. The system of claim 1 wherein the preferred resources are determined based on geographic proximity of one or more data objects related to a data storage request and available data storage resources.

3. The system of claim 1 wherein the preferred resources are determined based on network proximity of one or more data objects related to a data storage request and available data storage resources.

4. The system of claim 1 wherein the means for assigning the alternate set of resources includes a means for evaluating one or more rules to determine an alternate data path for performing a data storage request, wherein at least one rule is an overflow rule that indicates an alternate data path to use for performing the data storage request when the preferred set of data storage resources is unavailable.

5. The system of claim 1 wherein the means for assigning the alternate set of resources includes a means for evaluating one or more rules to determine an alternate data path for performing a data storage request, wherein at least one rule is an overflow rule that distributes data storage requests across sets of data storage resources in an alternating fashion to evenly distribute the data storage requests.

6. The system of claim 1, wherein the common characteristics of the data storage resources comprise: an access to a tape drive, an allocation of a stream for that tape drive, an available tape on which to store data, and a media agent computer to process and monitor the request.

7. The system of claim 1, wherein the table includes a row or column of priorities associated with each of multiple data management operations in a list of data management operations, wherein the data management operations are to be performed along one dimension of the table in priority order.

8. A method of dynamically assigning data storage requests to data storage resources, the method comprising:
   receiving an initial request plan specifying how an alternate data path is to be chosen when preferred data storage resources are not available;
   building a grid allocation table by grouping data storage resources in columns or rows of the grid allocation table according to common characteristics of the data storage resources;
   assigning, when preferred resources are available, a row or column, respectively, of the grid allocation table to a data allocation request using preferred data storage resources;
   assigning, when preferred data storage resources are not available, an alternate set of data storage resources to the data storage request;
      wherein each column or row of the grid allocation table operates independently on separate data storage requests;
   determining whether requested resources from a failed request comprise common or unique resources; and selectively adding the failed request to the blacklist table when the failed request corresponded to a common resource, and not adding the failed request to the blacklist table when the failed request corresponded to a unique requested resource.

9. The method of claim 8 wherein the preferred resources are determined based on geographic proximity of one or more data objects related to a data storage request and available data storage resources.

10. The method of claim 8 wherein the preferred resources are determined based on network proximity of one or more data objects related to a data storage request and available data storage resources.

11. The method of claim 8 wherein the assigning the alternate set of resources includes evaluating one or more rules to determine an alternate data path for performing a data storage request, wherein at least one rule is an overflow rule that indicates an alternate data path to use for performing the data storage request when the preferred set of data storage resources is unavailable.

12. The method of claim 8 wherein the assigning the alternate set of resources includes evaluating one or more rules to determine an alternate data path for performing a data storage request, wherein at least one rule is an overflow rule that distributes data storage requests across sets of data storage resources in an alternating fashion to evenly distribute the data storage requests.

13. The method of claim 8, wherein the common characteristics of the data storage resources comprise: an access to a tape drive, an allocation of a stream for that tape drive, an available tape on which to store data, and a media agent computer to process and monitor the request.

14. The method of claim 8 wherein the table includes a row or column of priorities associated with each of multiple data management operations in a list of data management operations, wherein the data management operations are to be performed along one dimension of the table in priority order.

15. A non-transitory computer-readable medium encoded with instructions for controlling a computer system in performing data management operations on data objects located at different physical locations, by a method comprising:
   determining, for each of multiple data management operation, whether each of multiple requested resources for use in performing the data management operation has been blacklisted by comparing a received data storage request to a generated blacklist table to blacklist that operation based on a resource requirement category of that operation;
   creating a data structure for allocating the data management resources,
      wherein the created data structure for resource allocation selects one or more data management resources to perform each of the multiple data management operations based at least in part on—
         a determined location of the one or more data objects affected by the data management operation, and
         a grouping of at least two of the data management resources based on a similarity of at least one determined characteristic;
   performing the data management operations based on the created logical data structure for resource allocation;
   determining whether requested resources from a failed request comprise common or unique resources; and
   selectively adding the failed request to the blacklist table when the failed request failed because of requested common resources and not adding the failed request to the blacklist table when the failed request failed because of unique requested resources.

16. The non-transitory computer-readable medium of claim 15 wherein the at least one determined characteristic comprises a geographic criteria based on subsets of data identified by a user and related to office locations of a business organization.

17. The non-transitory computer-readable medium of claim 15 wherein the data structure is a table, and further comprising grouping at least two of the data management resources based on similar data management resources within a column of the table.

18. The non-transitory computer-readable medium of claim 15 wherein performing the data management operations comprises performing in priority order operations along one dimension of the created logical data structure.

19. The non-transitory computer-readable medium of claim 15 wherein the determined location of the one or more data objects comprises determining a geographic location of a computer on which the data objects are stored.

20. The non-transitory computer-readable medium of claim 15 wherein the determined location of the one or more data objects comprises determining a network location of the data objects.

21. The non-transitory computer-readable medium of claim 15, wherein the resource requirement category comprises at least an access to a tape drive, an allocation of a stream for that tape drive, an available tape on which to store data, and a media agent computer to process and monitor the request.

\* \* \* \* \*